United States Patent [19]

Huggins

[11] Patent Number: 5,229,338
[45] Date of Patent: Jul. 20, 1993

[54] PREPARATION OF SILAZANE POLYMERS AND CERAMIC MATERIALS THEREFROM

[75] Inventor: John Huggins, Leverkusen, Fed. Rep. of Germany

[73] Assignee: Bayer Aktiengesellschaft, Leverkusen, Fed. Rep. of Germany

[21] Appl. No.: 875,926

[22] Filed: Apr. 29, 1992

[30] Foreign Application Priority Data

May 1, 1991 [DE] Fed. Rep. of Germany ....... 4114218

[51] Int. Cl.$^5$ .................. C04B 35/56; C04B 35/58
[52] U.S. Cl. ........................... 501/88; 501/92; 501/96; 501/97
[58] Field of Search .............. 501/97, 98, 96, 88, 501/92; 528/28

[56] References Cited

U.S. PATENT DOCUMENTS

| | | | |
|---|---|---|---|
| 4,482,669 | 11/1984 | Seyferth et al. | 524/442 |
| 4,656,300 | 4/1987 | Lebrun et al. | 556/412 |
| 4,720,532 | 1/1988 | Seyferth et al. | 578/28 |
| 4,757,035 | 7/1988 | Baney et al. | 501/88 |
| 4,937,304 | 6/1990 | Ayama et al. | 528/34 |
| 4,950,381 | 8/1990 | Takeuchi et al. | 528/10 |
| 4,954,596 | 9/1990 | Takeda et al. | 528/14 |

FOREIGN PATENT DOCUMENTS

| | | |
|---|---|---|
| 0202176 | 11/1986 | European Pat. Off. |
| 0296433 | 12/1988 | European Pat. Off. |
| 0296434 | 12/1988 | European Pat. Off. |
| 0364339 | 4/1990 | European Pat. Off. |
| 0368536 | 5/1990 | European Pat. Off. |
| 0323062 | 11/1990 | European Pat. Off. |
| 2218960 | 4/1972 | Fed. Rep. of Germany |
| 3719343 | 6/1987 | Fed. Rep. of Germany |
| 3736914 | 10/1987 | Fed. Rep. of Germany |
| 3639511 | 6/1988 | Fed. Rep. of Germany |
| 2599745 | 12/1987 | France |

*Primary Examiner*—Mark L. Bell
*Assistant Examiner*—Alan Wright
*Attorney, Agent, or Firm*—Sprung Horn Kramer & Woods

[57] ABSTRACT

A process for the preparation of a ceramic material comprising a) reacting at least one organochlorosilane of the formula $$\begin{array}{c} R^1 \\ | \\ Cl-Si-Cl \\ | \\ H \end{array} \quad (I)$$

in which $R^1$ is Cl, H, $C_1$ to $C_4$-alkyl or phenyl, optionally together with at least one organochlorosilane of the formula $$\begin{array}{c} R^2 \\ | \\ Cl-Si-Cl \\ | \\ Cl \end{array} \quad (II)$$

in which $R^2$ is Cl, $C_1$ to $C_4$-alkyl, vinyl or phenyl, with ammonia in an inert solvent to form a product of ammonolysis, b) polymerizing the product of ammonolysis in an inert solvent in the presence of a basic catalyst of the formula $$R^3R^4R^5R^6N^+A^- \quad (III)$$

in which
$R^3$, $R^4$, $R^5$ and $R^6$ each independently is an organic radical containing 1 to 24 carbon atoms, and
A is a basic anion which is capable of causing deprotonation, thereby to form an organic silazane polymer, c) rendering the catalyst inactive at a temperature above its decomposition temperature, and
d) sintering the silazane polymer.

14 Claims, No Drawings

PREPARATION OF SILAZANE POLYMERS AND CERAMIC MATERIALS THEREFROM

This invention relates to new organic silazane polymers, to a process for their preparation and to a process for the production of ceramic materials from these silazane polymers.

There has been great interest in recent times in processes for the production of ceramic materials containing silicon nitride/silicon carbide. Silicon nitride and silicon carbide have numerous desirable properties, such as chemical inertness, extreme hardness and stability at very high temperatures.

The pyrolysis of organic silazane polymers to ceramic materials containing silicon nitride/silicon carbide has already been repeatedly described in the literature (K. J. Wynne and R. W. Rice *Ann. Rev. Mater. Sci.* Vol. 14 (1984), 297-334; D. Seyferth in "Transformation of Organometallics into Common and Exotic Materials: Design and Activation" R. M. Laine, Ed., Martinus Nijhoff Publ., 1988, pages 133-154).

Polymer precursors for ceramic materials containing silicon nitride/silicon carbide are used inter alia in the production of ceramic coatings and fibers and as binders or matrix materials for the production of shaped parts from ceramic and metal powders or ceramic fibers. Organosilazanes are generally prepared from organochlorosilanes as starting materials, which are reacted with ammonia or primary or secondary amines. These products of ammonolysis are suitable only to a limited extent as precursors for ceramic materials as they provide only low ceramic yields when pyrolyzed at temperatures of from 800° to 2000° C. Numerous proposals have therefore been made for processes for the preparation of organic silazane polymers, characterized by higher ceramic yields from pyrolysis, as will be seen in particular from the literature references described below.

DE-A 2 218 960 discloses a process for the production of SiC/Si₃N₄ ceramic materials which consists in reacting chlorosilanes with amines or ammonia and then heating to high temperatures. Carbosilazane resins form in the process. The carbosilazane resins are then spun, rendered infusible and sintered at temperatures of from 800° to 2000° C. Formation of the carbosilazane resins requires high temperatures of from 520° to 650° C., so that this process is not very attractive for the industrial production of silazane polymers. Further, the carbosilazane resins have the disadvantage that the yield of ceramic materials produced from them is only about 55% by weight. In examples of practical application given in this reference, the only chlorosilazanes used are methyl trichlorosilane and dimethyldichlorosilane and the only amine used is methylamine.

U.S. Pat. No. 4,482,669 described a process for the preparation of organic silazane polymers in which ammonia is reacted with organochlorosilanes corresponding to the following general formula (I)

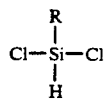
(1)

to form an ammonolysis product. This product of ammonolysis is then polymerized with basic catalysts to form silazane polymers. The silazane polymers obtained by this process are generally infusible solids but give rise to ceramic materials in high yields when pyrolyzed at temperatures of from 800° to 2000° C.

U.S. Pat. No. 4,720,532 describes a process for the preparation of organic silazane polymers in which ammonia is reacted with organochlorosilanes corresponding to the general formulae (1) and (2)

to form a product of ammonolysis.

This product of ammonolysis is polymerized with basic catalysts as in U.S. Pat. No. 4,482,669 to form silazane polymers. The silazane polymers obtained by this process produce ceramic materials in high yields when pyrolyzed at temperatures of up to 1000° C. The silazane polymers, however, are obtained as unfusible solids.

Several other processes for the preparation of organic silazane polymers by basic catalyzed polymerization of the products of ammonolysis of organochlorosilanes are disclosed in Patent Application DE-A 37 19 343, DE-A 37 36914EP-A 0 296 433, EP-A 0 296 434 and EP-A 323 062. These processes describe how soluble and fusible silazane polymers can be obtained by suitable choice of the organochlorosilanes used for ammonolysis. In all cases, however, a minimum proportion of chlorosilanes corresponding to the general formula (1) are used. An alkali metal-containing catalyst, preferably potassium hydride, is used for polymerization in all these processes. After polymerization, the catalyst is neutralized with a halogen-containing electrophilic compound such as methyl iodide or an organochlorosilane and the potassium halide precipitated is removed.

The processes described above have, however, numerous disadvantages.

The preferred catalysts, which are potassium hydride, sodium amide and potassium tri-(sec-butyl)boron hydride, are readily inflammable solids or form readily inflammable or spontaneously inflammable solutions which develop inflammable gases in the presence of atmospheric moisture. Handling large quantities of these substances entails a risk of fire and explosion. Expensive measures for avoiding these risks must therefore be employed when this process is carried out on an industrial scale.

All basic catalysts hitherto described contain alkali metal or alkaline earth metal cations as counter ions. To remove the cations, the catalysts are neutralized with halogen-containing electrophilic compounds and the resulting alkali metal halide or alkaline earth metal halide salts are separated off by filtration. These steps of neutralization and filtration are not only expensive but also relatively ineffective. Residues of alkali metal halide or alkaline earth metal halide salts are invariably left in the product as impurities. Such impurities are undesirable and may deleteriously affect the properties of a ceramic material produced from such polymers.

Some of the processes described result in infusible solids which do not have the capacity for being molded as is required for many applications.

In some processes for the preparation of fusible silazane polymers, considerable proportions of organochlorosilanes are used, which result in an elevated carbon content in the ceramic material. In DE-A 37 19 343, for example, the pyrolized ceramic material was found to have a carbon content of from 19.2 to 20.3% C, in DE-A 37 36 914 it was found to have a carbon content of from 17.8 to 19.3% C and in EP-A 323 062 the carbon content was found to be 21.1 to 22.5% C. A high carbon content in the ceramic is undesirable and leads to a reduced $Si_3N_4$ yield and increased quantities of SiC.

It is therefore an object of the present invention to provide a process for the preparation of organic silazane polymers which uses catalysts which are harmless and free from alkali metals and alkaline earth metals and leads to improved precursors of ceramic materials having good solubility, fusibility and processibility.

A process has now been found for the preparation of the required silazane polymers. The present invention thus relates to a process for the preparation of fusible organic silazane polymers, characterized in that a) one or more organochlorosilanes corresponding to formula (I)

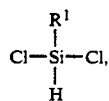 (I)

wherein $R^1$=Cl, H, $C_1$ to $C_4$-alkyl or phenyl, are reacted with ammonia in an inert solvent, either alone or together with one or more organochlorosilanes corresponding to formula (II)

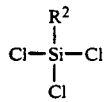 (II)

wherein $R^2$=Cl, $C_1$ to $C_4$-alkyl, vinyl or phenyl, to form a product of ammonolysis, and b) the product of ammonolysis is polymerized in an inert solvent in the presence of a basic catalyst corresponding to formula (III)

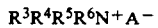 (III)

wherein $R^3$, $R^4$, $R^5$ and $R^6$ denote, independently of one another, organic groups having 1 to 24 carbon atoms and A stands for a basic anion capable of causing deprotonation, to form an organic silazane polymer, and c) the catalyst is rendered inert at a temperature above its decomposition temperature.

In the above formulae, $R^1$ and $R^2$ are preferably methyl groups.

As already mentioned, the use of chlorosilanes as starting materials for the preparation of silazane polymers and the base catalyzed polymerization of the corresponding products of ammonolysis are already known. It has not hitherto been described, however, nor suggested, that base catalyzed polymerization with catalysts corresponding to the general formula (III) could be carried out under certain reaction conditions whereby fusible silazane polymers with excellent properties could easily be obtained.

The organochlorosilane or organochlorosilane mixture used in the process according to the invention consists of a silane of formula (I) or of a combination of two or more silanes of formulae (I) and (II).

The following are examples of organochlorosilanes of formula (I) suitable for this purpose:
Methyldichlorosilane, phenyldichlorosilane, dimethylchlorosilane, phenylmethylchlorosilane, trichlorosilane and dichlorosilane.

The following are examples of organochlorosilanes of formula (II) suitable for this purpose:
Methyltrichlorosilane, vinyltrichlorosilane, phenyltrichlorosilane, ethyltrichlorosilane, propyltrichlorosilane, isobutyltrichlorosilane and tetrachlorosilane.

In a preferred embodiment of the process according to the invention, methyldichlorosilane is used alone or in admixture with methyltrichlorosilane or vinyltrichlorosilane. Mixtures of methyldichlorosilane with from 0 to 50 mol-% of methyltrichlorosilane or from 0 to 50 mol-% of vinyltrichlorosilane are preferred. It is particularly preferred to use methyldichlorosilane alone.

The organochlorosilane or organochlorosilane mixture used in the process according to the invention is reacted with ammonia to form products of ammonolysis. The measures for producing the ammonolysis product are not critical and are described in detail in U.S. Pat. No. 4,482,669 (see Columns 7, 8, 9). For example, the organochlorosilane mixture may be reacted with gaseous ammonia in an organic solvent and the organic solvent may be distilled off after the ammonium chloride formed as by-product has been removed by filtration. Solvents in which the ammonium chloride is only sparingly soluble and from which it can easily be separated are preferred, e.g. ethers and aliphatic, aromatic and chlorinated hydrocarbons. The ammonolysis is carried out with an excess of ammonia to ensure that the reaction will be complete and the end products will as far as possible be free from chlorine. At least 1.5 moles of ammonia are preferably used per mole of silicon-bound chlorine atoms of the organosilane mixture. The reaction is generally carried out at a temperature of about −80° to 120° C., preferably at −40° to 40° C.

In a further step, the product of ammonolysis is polymerized in the presence of a basic catalyst corresponding to formula (III) to form a fusible organic silazane polymer.

The basic catalyst according to the invention is preferably a tetraalkylammonium hydroxide or tetraalkylammonium alcoxide. The following are examples: Tetramethylammonium-, tetraethylammonium-, tetrapropylammonium-, tetrabutylammonium-, benzyltrimethylammonium-, benzyl triethylammonium-, benzyltributylammonium-, trimethyl-(2-hydroxyethyl)ammonium-, dodecyltrimethylammonium-, dodecyldimethyl(2-hydroxyethyl)-ammonium-and methyltrioctylammonium-complexes with hydroxyl and alcoxy ions, such as methoxy, ethoxy and the like. Catalysts such as tetraethylammonium methoxide, tetrabutylammonium methoxide and benzyltrimethylammonium methoxide are preferably used because of their availability and good solubility.

The catalyst may be introduced into the reaction mixture by various means. It may be used pure or as a solution in protic or aprotic organic solvents. It is preferred to use solutions in aprotic organic solvents. Many of these catalysts are available as solutions in protic solvents such as methanol and the like. A solution in an aprotic organic solvent such as pyridine, dimethyl sulfoxide, N,N-dimethylformamide or the like may easily be prepared by the method of Y. Sprinzak (J. Am. Chem. Soc., Volume 80 (1958), 5449-5455).

The polymerization according to the invention is carried out in a solvent. The solvents used may be ethers such as tetrahydrofuran (THF), dialkylethers or the like, aliphatic hydrocarbons such as pentane, hexane or the like, aromatic hydrocarbons such as benzene, toluene, xylene or the like and polar aprotic organic solvents such as dimethyl sulfoxide (DMSO), N,N-dimethyl formamide (DMF) and the like. It is preferable to use solvents in which both the product of ammonolysis and the catalyst are soluble.

Polymerization is preferably carried out in dilute solution at low catalyst concentrations and at room temperature. Solutions containing from 10 to 500 g/l of product of ammonolysis may be used. Solutions containing from 25 to 150 g/l of product of ammonolysis are preferred. The catalyst may be used in quantities of from 0.01 to 3% by weight, based on the product of ammonolysis. Catalyst quantities corresponding to 0.1 to 1.0% by weight are preferably used.

Polymerization is carried out at a temperature below the decomposition temperature of the catalyst. Temperatures of from 20° to 40° C. are preferred.

Polymerization is then terminated by raising the temperature and rendering the catalyst inactive. The catalysts according to the invention undergo one or more decomposition reactions at elevated temperatures and are thereby rendered inactive. These decomposition reactions vary according to the structure of the ammonium salt and appear at various temperatures. The products of decomposition are generally amines and hydrocarbons. In the preferred process, the catalyst is rendered inactive at temperatures of from 60° to 140° C. A silazane polymer having a melting point in the range of from 50° to 200° C. is finally obtained.

In the process according to the invention, the degree of polymerization and thereby the melting point of the silazane polymers can suitably be controlled by the choice of reaction conditions employed for polymerization. The important reaction conditions are the temperature and the duration of polymerization as well as the concentration of the ammonolysis product and the catalyst. The melting point is generally determined by the degree of polymerization of the silazane polymer. The melting point of the resulting silazane polymer increases with the polymerization temperature and with the polymerization time as well as with increasing concentrations of product of ammonolysis and of catalyst. The optimum polymerization time then depends on the selected reaction conditions and on the desired melting point of the silazane polymer.

Polymerization is terminated at the selected time by raising the temperature and rendering the catalyst inactive.

Polymerization proceeds by a reaction of Si-H with NH groups to form the new Si-N bonds and $H_2$. The progress of the reaction can be seen from the evolution of gas and demonstrated by the $^1H$ NMR spectrum of the silazane polymer. The integral ratio of Si-H to $SiCH_3$ in the $^1H$ NMR spectrum decreases as the reaction progresses.

It should be noted that in contrast to the processes hitherto known for the base catalyzed polymerization of ammonolysis products, the catalyst according to the invention need not be neutralized or filtered after polymerization. After termination of the reaction, the product is easily obtained by evaporation of the solvent and volatile constituents.

The process according to the invention for the preparation of fusible organic silazane polymers gives rise to organic silazane polymers of high quality. The silazane polymers have good solubility, fusibility and processibility. They can be rendered infusible. When sintered, they provide a high ceramic yield, for example of from 70 to 85% by weight. The process according to the invention uses no hazardous substances and is suitable for the industrial production of silazane polymers.

This invention thus also relates to an organic silazane polymer which is obtainable by
a) reacting one or more organochlorosilanes of formula (I)

wherein $R^1 =$ Cl, H, $C_1$ to $C_4$-alkyl or phenyl, alone or together with one or more organochlorosilanes of formula (II)

wherein $R^2 =$ Cl, $C_1$ to $C_4$-alkyl, vinyl or phenyl, with ammonia in an inert solvent to form a product of ammonolysis, and
b) polymerizing the product of ammonolysis in an inert solvent in the presence of a basic catalyst corresponding to formula (III)

wherein $R^3$, $R^4$, $R^5$ and $R^6$ denote, independently of one another, organic groups having 1 to 24 carbon atoms and A denotes a basic anion capable of causing deprotonation, to form an organic silazane polymer and
c) rendering the catalyst inactive at a temperature above its decomposition temperature.

The silazane polymer preferably has a melting point of from 50° to 200° C. and is free from alkali metals and alkaline earth metals.

This invention also relates to a process for the production of ceramic materials. For this purpose, the various organic silazane polymers prepared as described above are used as precursors for ceramic materials. Very pure ceramic products are thereby easily produced in the desired form and with excellent physical properties.

The process consists in sintering the organic silazane polymer to form a ceramic material.

The present invention thus also relates to a process for the production of ceramic materials, characterized in that
a) one or more organochlorosilanes corresponding to formula (I)

wherein $R^1 = Cl$, H, $C_1$ to $C_4$-alkyl or phenyl, alone or together with one or more organochlorosilanes of formula (II)

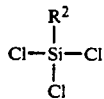 (II)

wherein $R^2 = Cl$, $C_1$ to $C_4$-alkyl, vinyl or phenyl, are reacted with ammonia in an inert solvent to form a product of ammonolysis and b) the product of ammonolysis is polymerized in an inert solvent in the presence of a basic catalyst of formula (III)

$$R^3R^4R^5R^6N^+A^-$$ (III)

wherein $R^3$, $R^4$, $R^5$ and $R^6$ denote, independently of one another, organic groups having 1 to 24 carbon atoms and A stands for a basic anion capable of causing deprotonation, to form an organic silazane polymer, and c) the catalyst is rendered inactive at a temperature above its decomposition temperature and d) the silazane polymer is sintered to form a ceramic material.

In a preferred embodiment, the silazane polymer is melted, shaped and sintered to produce a ceramic material.

In a particularly preferred embodiment, the organic silazane polymer is applied to a surface to produce coatings or is spun to produce fibers or mixed with temperature resistant powders or fibers and then shaped by the action of heat and/or pressure to produce moulded parts. The silazane polymer may be rendered infusible by tempering, oxidation, hydrolysis or irradiation after it has been applied, spun or shaped. The silazane polymer is then sintered at temperatures of from 800° to 2000° C. to form a ceramic material.

The shaping process may be carried out by various means according to the form of the desired ceramic article. Coatings may be produced from solutions. Fibers may be spun. To produce molded articles, the polymers may be mixed with ceramic or metal powders or ceramic fibers and then shaped under pressure or heat by injection molding, pressure molding or hot pressing.

The moulded parts may then be rendered infusible by heating in air or by irradiation with an electron beam or irradiation with ultraviolet rays or other methods.

After the organic silazane polymers according to the invention have been shaped, they are sintered at temperatures in the range of from 800° to 2000° C. to form ceramic materials. The sintering is preferably carried out in two stages. The silazane polymer is pyrolyzed at temperatures of from 800° to 1500° C. and converted into a ceramic material which is for the most part amorphous. The ceramic part is compacted at temperatures of from 1500° to 2000° C., depending on the sinter additives used. The ceramic yield is determined predominantly by the process of pyrolysis up to 1500° C.

Sintering is carried out under vacuum or in an inert gas atmosphere such as $N_2$, He, Ar or the like. A ceramic material composed of SiC and $Si_3N_4$ is thus obtained. If sintering is carried out at least in part in an atmosphere of $H_2$ or $NH_3$, the ceramic obtained is almost free from carbon and consists mainly of $Si_3N_4$.

The invention will be further described in the following examples which serve merely to illustrate the invention and should in no way limit the scope of the invention.

EXAMPLES

Example 1

Ammonolysis of methyldichlorosilane 288 g (2.5 mol) of methyldichlorosilane and 2 liters of dried toluene were introduced into a 3-liter four-necked flask equipped with stirrer, thermometer, $NH_3$ gas inlet tube and dry ice cooler. The temperature was lowered to $-15°$ C. to $-20°$ C. by external cooling and 190 g (11.2 mol, 50% excess) of $NH_3$ were introduced over a period of 4 hours. The reaction temperature rose to $10°-15°$ C. but fell to below $-20°$ C. as the solution became saturated. The cooling was removed and the temperature of the solution was slowly raised to room temperature to permit the excess $NH_3$ to evaporate. The precipitated ammonium chloride was separated by filtration and the filter cake was washed three times with 100 ml of toluene. The toluene was evaporated at reduced pressure until 30° C. and 1 mbar.

The product of ammonolysis (1) was obtained in a quantity of 134 g as a slightly cloudy, colorless liquid having a viscosity of 50 mPa.s (25° C.).

$^1$H-NMR (300 MHz), $CDCl_3$, ppm): $\delta 0.0-0.3$ (br, $SiCH_3$, Int. 126), 0.5–1.1 (br, NH, Int. 33), 4.3–5.0 (mult, SiH, Int. 38), Analysis: Si, 50.5%.

A ceramic material was obtained in a yield of 48% when this product was pyrolyzed in a nitrogen atmosphere at temperatures of up to 1400° C. and a heating rate of 5 degrees Centigrade per minute.

Example 2

Ammonolysis of methyldichlorosilane and methyltrichlorosilane in the ratio of 50:50 (mol-%)

150 g (1.3 mol) of methyldichlorosilane, 194 g (1.3 mol) of methyltrichlorosilane and 2.5 liters of dried toluene were introduced into a 4-liter four-necked flask equipped with stirrer, thermometer, $NH_3$ gas inlet tube and dry ice cooler. The temperature was lowered to $-15°$ C. to $-20°$ C. by external cooling and 285 g (16.8 moles, 70% excess) of $NH_3$ were introduced over a period of 7 hours. During this time, the reaction temperature rose from time to time to $10°-15°$ C. but fell to below $-20°$ C. after saturation of the solution. The cooling device was removed and the solution was slowly heated to room temperature to permit the excess $NH_3$ to evaporate. The precipitated ammonium chloride was separated by filtration and the filter cake was washed three times with 100 ml portions of toluene. The toluene was evaporated off at reduced pressure up to 60° C. and 1 mbar.

The product of ammonolysis (2) was obtained in a quantity of 137 g as a cloudy, colourless liquid.

$^1$H-NMR (300 MHz), $CDCl_3$, ppm): 0.0–0.3 (br. $SiCH_3$), Int. 112) 0.5–1.3 (br, NH, Int. 38) 4.2–5.0 (mult, SiH, Int. 18).

Example 3

Polymerization of (1) with 0.25% by weight of benzyl trimethylammonium methoxide 10 g of the product of ammonolysis (1) of Example 1 and 150 g of dried THF were introduced into a 500 ml two-necked flask equipped with magnetic stirrer and cooler and the contents of the flask were covered with $N_2$. A mixture of 0.2 g (0.25% by weight) of a 12.2% solution of benzyl trimethylammonium methoxide in dimethyl sulfoxide and 5 g of THF was prepared and added over 5 minutes. Slight evolution of gas was observed. The solution was stirred at 25° C. for 30 minutes and heated at reflux for 3 hours. The product was freed from THF and volatile constituents at 40° C. and 1 mbar.

The silazane polymer was obtained in a quantity of 5.8 g as a pink, brittle solid melting at 75° C.

$^1$H-NMR (300 MHz, acetone-$d_6$, ppm): δ0.00–0.5 (br, $SiCH_3$, Int. 147.1), 1.0–2.4 (br, NH, Int. 23.3), 3.4–3.5 (br, $SiOCH_3$, Int. 1), 4.4–5.1 (br, SiH, Int. 31.6). IR (KBr, $cm^{-1}$): 3400 (br, m), 2960 (sh, m), 2900 (sh, w), 2120 (sh, s), 1400 (br, w), 1260 (sh, s), 1175 (br, s), 850–1020 (br, vs), 760 (br, s). Analysis: C: 22.9%; N: 25.1%; O: 4.6%; Si: 44.0%.

A ceramic material containing silicon nitride and having a carbon content of 9.1% by weight was obtained in a yield of 78% when this product was pyrolyzed in a nitrogen atmosphere at temperatures of up to 1400° C. and a heating rate of 5 degrees Centigrade per minute.

EXAMPLE 4

Polymerization of (1) with 0.25% by weight of tetrabutylammonium hydroxide 0.1 g (0.25% by weight) of a 25% solution of tetrabutylammonium hydroxide in methanol was introduced into a 250 ml one-necked flask equipped with magnetic stirrer and cooler and the excess methanol was evaporated off in a water jet vacuum at 25° C. The ammonium salt was dissolved in 100 g of THF and covered with $N_2$. A solution of 10 g of the product of ammonolysis (1) in 50 g of THF was added. Slight evolution of gas was observed. The solution was stirred at 25° C. for one hour and heated at reflux for 3 hours. The THF was distilled off at 25° C. and 30 mbar and the product was freed from volatile constituents at 60° C. and 1 mbar.

The silazane polymer was obtained in a quantity of 6.8 g as a white, brittle solid melting at 105° C.

$^1$H-NMR (300 MHz, $CDCl_3$, ppm): δ0.00–0.5 (br, $SiCH_3$, Int. 125) 0.6–1.3 (br, NH, Int. 31), 3.4–3.5 (br, $SiOCH_3$, Int. 1), 4.5–5.0 (br, SiH, Int. 18.5). IR (KBr, $cm^{-1}$): 3400 (br, s), 2980 (sh, m) 2900 (sh, w), 2120 (sh, m), 1630 (br, m), 1400 (br, w), 1260 (sh, s), 1170 (br, s), 850–1020 (br, vs), 760 (br, s). Analysis: Si: 43.6%. The silazane polymer contains <10 ppm of potassium.

EXAMPLES 5 to 11

Polymerization of (1) with benzyltrimethylammonium methoxide

Polymerization of 10 g of the product of ammonolysis from (1) in dried THF was carried out as in Example 3. $PhCH_2NMe_3+MeO$ was used as catalyst in the form of a 12% solution in dimethyl sulfoxide. The various reaction conditions and the results are summarized in Table 1.

TABLE I

| No. | Conc. g/l[a] | Cat. % by wt.[b] | Temp. °C. | Time min.[c] | Yield % | Mp. °C. |
|---|---|---|---|---|---|---|
| 5 | 55 | 0.25 | 25 | 30 | 61 | 70 |
| 6 | 55 | 0.25 | 25 | 60 | 80 | 89 |
| 7 | 55 | 0.25 | 25 | 180 | 95 | 96 |
| 8 | 55 | 0.25 | 40 | 60 | 78 | 135 |
| 9 | 130 | 0.25 | 25 | 30 | 72 | 120 |
| 10 | 55 | 0.5 | 25 | 30 | 80 | 130 |
| 11 | 180 | 1.0 | 25 | 60 | 88 | —[d] |

[a] Concentration of the product of ammonolysis in THF
[b] based on g of product of ammonolysis
[c] then heated at reflux for 3 hours
[d] no melting point

EXAMPLE 12

Polymerization of (2) with 0.25% by weight of benzyltrimethylammonium methoxide 10 g of the product of ammonolysis (2) and 140 g of dried THF were introduced into a 250 ml two-necked flask equipped with magnetic stirrer and cooler and the reaction mixture was covered with $N_2$. A mixture of 0.2 g (0.25% by weight) of a 12.2% solution of benzyl trimethylammonium methoxide in dimethylsulphoxide and 10 g of THF was prepared and added within 10 minutes. Vigorous evolution of gas was observed. The solution was stirred at 25° C. for 30 minutes and then heated at reflux for 3 hours. The product was freed from THF and volatile constituents at 40° C. and 1 mbar. The silazane polymer was obtained in a quantity of 6.4 g as a soluble, pink solid having a softening point of 60° C. IR (KBr, $cm^{-1}$): 3400 (br, m), 2955 (sh, m), 2900 (sh, w), 2120 (sh, m), 1410 (br, W), 1260 (sh, s), 1170 (br, s), 700–1000 (br, vs).

EXAMPLE 13

Ammonolysis of methyldichlorosilane and polymerization with tetrabutyl ammonium hydroxide 368 g (3.2 mol) of methyldichlorosilane and 2.5 liters of dried THF were introduced into a 4 liter four-necked flask equipped with stirrer, thermometer, $NH_3$ gas inlet tube and dry ice cooler. 245 g (17.5 mol, excess) of $NH_3$ were then introduced over 4 hours without external cooling. The reaction temperature rose to 30° C. but fell to below 20° C. The cooling device was removed to permit excess $NH_3$ to evaporate. The precipitated ammonium chloride was separated by filtration and the filter cake was washed three times with 100 ml of THF.

The filtrate (2150 g) was introduced into a 3 liter four-necked flask equipped with stirrer, thermometer, dropping funnel and water cooler. The excess methanol was then removed from 1.36 g (about 0.25% by weight) of a 25% solution of tetrabutylammonium hydroxide in methanol by vacuum and the residue was dissolved in 45 g of THF. This solution was added dropwise over a period of 5 minutes, and vigorous evolution of gas was observed. The solution was stirred at 25° C. for 3 hours and heated at reflux for 3 hours. The product was freed from THF and volatile constituents at 1 mbar and temperatures of up to 60° C. The silazane polymer was obtained in a quantity of 130 g as a slightly pink, brittle solid having a melting point of 85° C.

$^1$H-NMR (300 MHz, $CDCl_3$, ppm): δ0.00–0.5 (br, $SiCH_3$, Int. 124.7), 0.6–1.3 (br, NH, Int. 27), 3.4–3.5 (br, SiOCH$_3$, Int. 1), 4.3–5.0 (br, SiH, Int. 18.2). Analysis: Si: 45.5%; K: <1 ppm.

EXAMPLE 14 (Comparison Example)

Polymerization of (1) with potassium hydride 5.71 g (2.7% by weight) of a 35% dispersion of KH in mineral oil were introduced into a 2-liter three-necked flask equipped with stirrer, thermometer, dropping funnel and cooler. The dispersion was washed twice with 50 ml of dried hexane to remove the mineral oil. 800 ml of dried THF were then added. A solution of 74 g of the product of ammonolysis (1) in 200 ml of THF was then added dropwise over 10 minutes with constant stirring. Evolution of gas was observed and was completed after 2.5 hours. A further 10.6 g of methyl iodide was added and the reaction mixture was stirred overnight. The THF was evaporated off at 30 mbar and 25° C. and the residue was dissolved in 300 ml of hexane. The precipitated KI was separated by filtration. The product was freed from solvents and volatile constituents at 1 mbar and temperatures of up to 30° C. 74 g of a white solid without a melting point were obtained as product.

$^1$H-NMR (300 mHz, CDCl$_3$, ppm): δ0.0–0.5 (br, SiCH$_3$, Int. 102), 0.5–1.8 (br, NH, Int. 44), 2.5 (br, NCH$_3$, Int. 3), 4.5–5.0 (br, SiH, Int. 18). IR (KBr, cm$^{-1}$): 3400 (br, m), 2960 (sh, m), 2900 (sh, w), 2130 (sh, m), 1410 (br, w), 1260 (sh, s), 1150–1200 (br, s), 820–1030 (br, vs), 750 (br, m).

Analyses: C: 22.3%; N: 21.0%; Si: 42.7%. The product also contains 90 ppm of potassium and 350 ppm of iodine.

A ceramic material was obtained in a yield of 71% when this silazane polymer was pyrolyzed in a nitrogen atmosphere at temperatures of up to 1400° C. and a heating rate of 5 degrees Centigrade per minute. In spite of the good ceramic yield, this silazane polymer is unsuitable for use as preceramic material for many applications owing to its lack of fusibility.

EXAMPLE 15 (Comparison Example)

Ammonolysis of methyldichlorosilane and dimethyldichlorosilane in a ratio of 67:33 (mol-%) and polymerization with KH a) Ammonolysis 413 g (3.6 mol) of methyldichlorosilane, 150 g (1.16 mol) of dimethyldichlorosilane and 2.2 liters of dried THF were introduced into a 4-liter four-necked flask equipped with stirrer, thermometer, NH$_3$ gas inlet tube and dry ice cooler. The temperature was lowered to −15° C. to −20° C. by external cooling and 365 g (21.5 mol), 50% excess) of NH$_3$ were introduced in the course of 7 hours. The cooling was removed and the solution was slowly heated to room temperature to permit the excess NH$_3$ to evaporate. The precipitated ammonium chloride was separated by filtration and the filter cake was washed three times with 100 ml portions of THF.

b) Polymerization 11.5 g (about 2% by weight) of a 35% KH dispersion in mineral oil were introduced into a 3-liter three-necked flask equipped with stirrer, thermometer, dropping funnel and cooler. The dispersion was washed three times with 50 ml of dried hexane to remove the mineral oil. The THF solution of the product of ammonolysis from (a) was then added over a period of 15 minutes. Vigorous evolution of gas was observed. The evolution of gas was completed after 5 hours. A further 15 g of methyl iodide was added and the reaction mixture was stirred overnight. The THF was evaporated at 30 mbar and 25° C. and the residue was dissolved in 1200 ml of hexane. The precipitated KI was separated by filtration. The product was freed from solvent and volatile constituents at 40° C. and 1 mbar. 198 g of a white solid melting at 95° C. was obtained as product.

$^1$H-NMR (300 MHz, CDCl$_3$, ppm): δ0.0–0.5 (br, SiCH$_3$, Int. 146) 0.5–1.8 (br, NH, Int. 23), 2.5 (br, NCH$_3$, Int. 1), 4.5–5.0 (br, SiH, Int. 14). IR (KBr, cm$^{-1}$): 3400 (br, m), 2960 (sh, m), 2900 (sh, w), 2120 (sh, m), 1410 (br, w), 1260 (sh, s), 1160 (br, s), 870–1020 (br, vs), 790 (br, w).

Analysis: Si, 44.2%. The product contains 20 ppm of potassium and 30 ppm of iodine.

A ceramic material having a carbon content of 14.1% by weight was obtained in a yield of 64% when this silazane polymer was pyrolyzed in a nitrogen atmosphere at temperatures of up to 1400° C. and a heating rate of 5° C./minute.

It will be understood that the specification and examples are illustrative but not limitative of the present invention and that other embodiments within the spirit and scope of the invention will suggest themselves to those skilled in the art.

I claim:

1. A process for the preparation of a fusible organic silazane polymer comprising a) reacting at least one organochlorosilane of the formula

in which R$^1$ is Cl, H, C$_1$ to C$_4$-alkyl or phenyl, optionally together with at least one organochlorosilane of the formula

in which R$^2$ is Cl, C$_1$ to C$_4$-alkyl, vinyl or phenyl, with ammonia in an inert solvent to form a product of ammonolysis, b) polymerizing the product of ammonolysis in an inert solvent in the presence of a basic catalyst of the formula

in which

R$^3$, R$^4$, R$^5$ and R$^6$ each independently is an organic radical containing 1 to 24 carbon atoms, and A is a basic anion which is capable of bringing about de-protonization, thereby to form an organic silazane polymer, and thereafter c) rendering the catalyst inactive by raising the temperature of the reaction mixture to a temperature above its decomposition temperature.

2. A process for the production of ceramic material comprising first preparing a fusible organic silazane polymer by:

a) reacting at least one organochlorosilane of the formula $$\text{Cl}-\underset{\underset{\text{H}}{|}}{\overset{\overset{\text{R}^1}{|}}{\text{Si}}}-\text{Cl} \quad (I)$$

in which $R^1$ is Cl, H, $C_1$ to $C_4$-alkyl or phenyl, optionally together with at least one organochlorosilane of the formula $$\text{Cl}-\underset{\underset{\text{Cl}}{|}}{\overset{\overset{\text{R}^2}{|}}{\text{Si}}}-\text{Cl} \quad (II)$$

in which $R^2$ is Cl, $C_1$ to $C_4$-alkyl, vinyl or phenyl, with ammonia in an inert solvent to form a product of ammonolysis, b) polymerizing the product of ammonolysis in an inert solvent in the presence of a basic catalyst of the formula $$R^3R^4R^5R^6N^+A^- \quad (III)$$

in which $R^3$, $R^4$, $R^5$ and $R^6$ each independently is an organic radical containing 1 to 24 carbon atoms, and A is a basic anion which is capable of bringing about de-protonization, thereby to form an organic silazane polymer, thereafter c) rendering the catalyst inactive by raising the temperature of the reaction mixture to a temperature above its decomposition temperature, and d) sintering the organic silazane polymer.

3. A process according to claim 1, wherein (I) is methyl dichlorosilane.

4. A process according to claim 1, wherein in step (a) there is employed a mixture of from 0 to about 50 mol-% of methyltrichlorosilane and from about 50 to 100 mol-% of methyldichlorosilane.

5. A process according to claim 1, wherein in step (b) the catalyst is a tetraalkylammonium hydroxide or tetraalkylammonium alkoxide.

6. A process according to claim 1, wherein in step (b) the catalyst is tetramethylammonium hydroxide, tetramethylammonium methoxide, tetraethylammonium hydroxide, tetraethylammonium methoxide, tetrabutylammonium hydroxide, tetrabutylammonium methoxide, benzyl trimethylammonium hydroxide, benzyl trimethylammonium methoxide, a ($C_4$-$C_{24}$-alkyl)-trimethylammonium hydroxide or a ($C_4$-$C_{24}$-alkyl)-trimethylammonium methoxide.

7. A process according to claim 5, wherein the product of ammonolysis is initially brought to reaction at a relatively low temperature by means of the basic catalyst of formula (III) in an inert solvent at a concentration of about 25 to 150 g/l and the catalyst is then rendered inactive by heating to a temperature above the decomposition temperature of the catalyst.

8. A process according to claim 2, wherein the silazane polymer is melted, shaped and sintered to form the ceramic material.

9. A process according to claim 1, wherein the silazane polymer is applied to a surface to coat a substrate and is sintered to form a ceramic coating.

10. A process according to claim 2, wherein the silazane polymer is mixed with ceramic or metal powder or ceramic fibers and the mixture is molded under the action of at least one of heat and pressure and sintered to form a ceramic material.

11. A process according to claim 2, wherein after the silazane polymer has been shaped, it is rendered infusible by tempering, oxidation, hydrolysis or irradiation and is sintered to form a ceramic material.

12. A process according to claim 11, wherein infusibility is effected by sintering at a temperature from about 800° to 2000° C.

13. A process according to claim 12, wherein sintering is carried out in a vacuum or an inert gas atmosphere.

14. A process according to claim 12, wherein sintering is carried out at least in part in an $H_2$ or $NH_3$ atmosphere.

* * * * *

UNITED STATES PATENT AND TRADEMARK OFFICE
CERTIFICATE OF CORRECTION

PATENT NO. : 5,229,338

DATED : July 20, 1993

INVENTOR(S) : John Huggins

It is certified that error appears in the above-identified patent and that said Letters Patent is hereby corrected as shown below:

Col. 14, line 25   Delete " claim 1 " and substitute -- claim 2 --

Signed and Sealed this

Eighteenth Day of October, 1994

Attest:

BRUCE LEHMAN

*Attesting Officer*     *Commissioner of Patents and Trademarks*